United States Patent
Taketa et al.

(10) Patent No.: US 10,808,091 B2
(45) Date of Patent: Oct. 20, 2020

(54) NOTCHED PRE-PREG AND NOTCHED PRE-PREG SHEET

(71) Applicant: Toray Industries, Inc., Tokyo (JP)

(72) Inventors: Ichiro Taketa, Iyo-gun (JP); Yuzo Fujita, Iyo-gun (JP); Nobuyuki Arai, Iyo-gun (JP); Narumichi Sato, Iyo-gun (JP)

(73) Assignee: Toray Industries, Inc., Tokyo (JP)

( * ) Notice: Subject to any disclaimer, the term of this patent is extended or adjusted under 35 U.S.C. 154(b) by 390 days.

(21) Appl. No.: 15/511,823

(22) PCT Filed: Sep. 14, 2015

(86) PCT No.: PCT/JP2015/076001
§ 371 (c)(1),
(2) Date: Mar. 16, 2017

(87) PCT Pub. No.: WO2016/043156
PCT Pub. Date: Mar. 24, 2016

(65) Prior Publication Data
US 2017/0283571 A1  Oct. 5, 2017

(30) Foreign Application Priority Data
Sep. 19, 2014  (JP) ................... 2014-191083

(51) Int. Cl.
*C08J 5/24* (2006.01)
*B32B 5/12* (2006.01)
(Continued)

(52) U.S. Cl.
CPC ................ *C08J 5/24* (2013.01); *B32B 3/266* (2013.01); *B32B 5/022* (2013.01); *B32B 5/024* (2013.01);
(Continued)

(58) Field of Classification Search
CPC .. C08J 5/24; C08J 5/042; C08J 2377/00; C08J 2363/02; B32B 29/02; B32B 27/365;
(Continued)

(56) References Cited

U.S. PATENT DOCUMENTS 5,169,710 A    12/1992  Qureshi et al.
2013/0095282 A1*  4/2013  Taketa ................. B29O 43/222
                                                                428/113

FOREIGN PATENT DOCUMENTS

JP    1575158        7/1986
JP    01-104624 A    4/1989
(Continued)

OTHER PUBLICATIONS

Machine Translation of JP 2009-286817(A), Dec. 2009. (Year: 2009).*

(Continued)

*Primary Examiner* — Brian Handville
(74) *Attorney, Agent, or Firm* — DLA Piper LLP (US)

(57) ABSTRACT

An intermediate base material has high handleability and shape conformity to complicated shapes and serves to perform high-yield production, even by low pressure molding, of fiber reinforced plastic material that do not suffer from significant generation of molding defects, such as creases and voids, that can cause a decrease in strength and that has good mechanical characteristics, decreased variations therein, and high dimensional stability. The prepreg includes a layer containing reinforcement fibers impregnated with a resin composition and the impregnation rate with the resin composition in the prepreg is in a predetermined range. It is characterized by being an incised prepreg having a plurality of incisions, being at least partly formed of reinforcement (Continued)

fibers with a predetermined fiber length, and having a reinforcement fiber content by volume Vf in a predetermined range.

14 Claims, 8 Drawing Sheets

(51) Int. Cl.
| | |
|---|---|
| B32B 3/26 | (2006.01) |
| B32B 27/36 | (2006.01) |
| B32B 15/09 | (2006.01) |
| B32B 27/28 | (2006.01) |
| B32B 15/14 | (2006.01) |
| B32B 15/088 | (2006.01) |
| B32B 5/02 | (2006.01) |
| B32B 27/30 | (2006.01) |
| B32B 5/26 | (2006.01) |
| B32B 29/02 | (2006.01) |
| B32B 27/10 | (2006.01) |
| B32B 15/082 | (2006.01) |
| B32B 15/085 | (2006.01) |
| B32B 27/12 | (2006.01) |
| B32B 27/32 | (2006.01) |
| B32B 7/04 | (2019.01) |
| B32B 27/34 | (2006.01) |
| B32B 15/20 | (2006.01) |
| B32B 15/08 | (2006.01) |
| B32B 5/10 | (2006.01) |
| B32B 27/08 | (2006.01) |
| C08J 5/04 | (2006.01) |
| B29C 43/12 | (2006.01) |

(52) U.S. Cl.
CPC ............... *B32B 5/026* (2013.01); *B32B 5/10* (2013.01); *B32B 5/12* (2013.01); *B32B 5/26* (2013.01); *B32B 7/04* (2013.01); *B32B 15/08* (2013.01); *B32B 15/082* (2013.01); *B32B 15/085* (2013.01); *B32B 15/088* (2013.01); *B32B 15/09* (2013.01); *B32B 15/14* (2013.01); *B32B 15/20* (2013.01); *B32B 27/08* (2013.01); *B32B 27/10* (2013.01); *B32B 27/12* (2013.01); *B32B 27/281* (2013.01); *B32B 27/283* (2013.01); *B32B 27/285* (2013.01); *B32B 27/286* (2013.01); *B32B 27/288* (2013.01); *B32B 27/302* (2013.01); *B32B 27/304* (2013.01); *B32B 27/308* (2013.01); *B32B 27/32* (2013.01); *B32B 27/322* (2013.01); *B32B 27/34* (2013.01); *B32B 27/36* (2013.01); *B32B 27/365* (2013.01); *B32B 29/02* (2013.01); *C08J 5/042* (2013.01); *B29C 43/12* (2013.01); *B32B 2255/06* (2013.01); *B32B 2255/10* (2013.01); *B32B 2255/12* (2013.01); *B32B 2255/205* (2013.01); *B32B 2255/26* (2013.01); *B32B 2260/023* (2013.01); *B32B 2260/046* (2013.01); *B32B 2262/0269* (2013.01); *B32B 2262/10* (2013.01); *B32B 2262/101* (2013.01); *B32B 2262/106* (2013.01); *B32B 2307/54* (2013.01); *B32B 2605/08* (2013.01); *B32B 2605/18* (2013.01); *C08J 2363/02* (2013.01); *C08J 2377/00* (2013.01)

(58) Field of Classification Search
CPC ......... B32B 27/36; B32B 5/024; B32B 5/022; B32B 27/34; B32B 27/322; B32B 27/32; B32B 27/308; B32B 27/304; B32B 27/302; B32B 27/288; B32B 27/286; B32B 27/285; B32B 27/283; B32B 27/281; B32B 27/12; B32B 27/10; B32B 15/20; B32B 15/14; B32B 15/09; B32B 15/088; B32B 15/085; B32B 15/082; B32B 15/08; B32B 7/04; B32B 5/26; B32B 5/026; B32B 3/266; B32B 5/12; B32B 27/08; B32B 5/10; B32B 2605/18; B32B 2307/54; B32B 2262/101; B32B 2262/10; B32B 2262/0269; B32B 2260/046; B32B 2260/023; B32B 2255/26; B32B 2255/205; B32B 2255/12; B32B 2255/10; B32B 2255/06; B32B 2605/08; B32B 2262/106; B29C 43/12
See application file for complete search history.

(56) References Cited

FOREIGN PATENT DOCUMENTS

| | | | |
|---|---|---|---|
| JP | 02-32843 | A | 2/1990 |
| JP | 02-69566 | | 3/1990 |
| JP | 04-292634 | A | 10/1992 |
| JP | 2001-038752 | A | 2/2001 |
| JP | 2003-165851 | A | 6/2003 |
| JP | 2009-286817 | A | 12/2009 |
| JP | 2010-023449 | A | 2/2010 |
| JP | 2013-142123 | A | 7/2013 |
| WO | 94/16003 | A1 | 7/1994 |
| WO | WO-2008099670 | A1 * | 8/2008 ........... B29C 43/222 |
| WO | 2013/096968 | A2 | 6/2013 |
| WO | 2014/017339 | A1 | 1/2014 |

OTHER PUBLICATIONS

Machine Translation of JP 2013-142123 A. (Year: 2013).*
Machine Translation of JP 2010-023449 A. (Year: 2010).*

* cited by examiner

NOTCHED PRE-PREG AND NOTCHED PRE-PREG SHEET

TECHNICAL FIELD

This disclosure relates to a prepreg including a layer containing reinforcement fiber impregnated with a resin composition, the prepreg being an incised prepreg having a plurality of incisions. More specifically, it relates to an incised prepreg used favorably as an intermediate base material for fiber reinforced plastics preferably used to produce aircraft members, automobile members, sports tools and the like.

BACKGROUND

Fiber reinforced plastic materials including a reinforcement fiber and a matrix resin generally have high specific strength, high specific modulus and good mechanical characteristics, as well as good functional characteristics such as high weather resistance and chemical resistance and, accordingly, increasing attention has been focused on them in various industrial fields. Demand has increased in recent years as they come into wider use for structural members of aircraft, spacecraft, automobiles, railroad vehicles, ships, electric appliances, sports goods and the like. In particular, it is known that high quality fiber reinforced plastic materials can be obtained by stacking plies of a prepreg, which is an intermediate base material produced by impregnating continuous reinforcement fiber with thermosetting resin or thermoplastic resin, and subjecting the stack to compression molding in an autoclave or the like.

It is difficult to produce a three dimensional structure from a prepreg of continuous fibers, but there is a technique called automatic tape lay-up that slits prepreg plies into strips with a width of several millimeters and stacks them in a three dimensional form. Actually, setting these narrow strips substantially in a two dimensional arrangement serves to form details of a complicated shape (for example, see Japanese Patent No. 1575158). However, this has the disadvantage of low productivity when applied to a large-area three dimensional laminate composed of thick-wall members. Compared to this, there is a known high-productivity technique called hot forming, which processes a stack of flat prepreg plies into a three dimensional shape in one stroke (for example, see Japanese Unexamined Patent Publication (Kokai) No. 2001-38752). However, this has the disadvantage of the occurrence of creasing and bridging (bracing by fibers) attributed to insufficient deformability of the prepreg during the forming step, leading to a decrease in the yield of fiber reinforced plastic material. The prepreg plies in the stack become thinner as they are solidified into fiber reinforced plastic material. Accordingly, the prepreg plies formed in a part where the shape deforms, e.g., a curved part, undergo a difference in circumferential length between the top and the bottom of the prepreg laminate during the solidification step. Since the prepreg laminate is formed of continuous reinforcement fibers that are low in stretchability, deficient forming may occur due to creasing as a result of buckling to eliminate the difference in circumferential length or bridging as a result of insufficient conformity to the intended. The molding pressure will not effectively reach the fibers located immediately below the bridged part, thereby easily leading to generation of voids. Such void generation can be a more serious problem in low pressure molding processes such as oven molding that uses a vacuum pump as a means of compression.

In view of such background technology, it could be helpful to provide an intermediate base material that has high handleability and high shape conformity to complicated shapes when used to form or mold a two-dimensional sheet-like intermediate base material into a three dimensional shape by hot forming or other techniques, and that serves to produce a fiber reinforced plastic material suffering from few significant molding defects such as creases and voids, that reduce the strength of members even when using a low pressure molding technique useful for molding large members with small equipment investment, thus leading to a large yield, good mechanical characteristics, and high surface quality, and to provide a method that uses such an intermediate base material to produce fiber reinforced plastic materials.

SUMMARY

We thus provide a prepreg including a layer containing reinforcement fiber impregnated with a resin composition, the prepreg being an incised prepreg having a plurality of incisions, at least partly formed of reinforcement fibers with a fiber length (denoted as L) of 10 to 300 mm, and having a reinforcement fiber content by volume Vf of 45% to 65%.

The intermediate base material formed of a fiber reinforced plastic is high in formability into a three dimensional shape and high in molding robustness to depress generation of molding defects that can cause a decrease in the strength of members.

EXPLANATION OF NUMERALS

Figure 1:
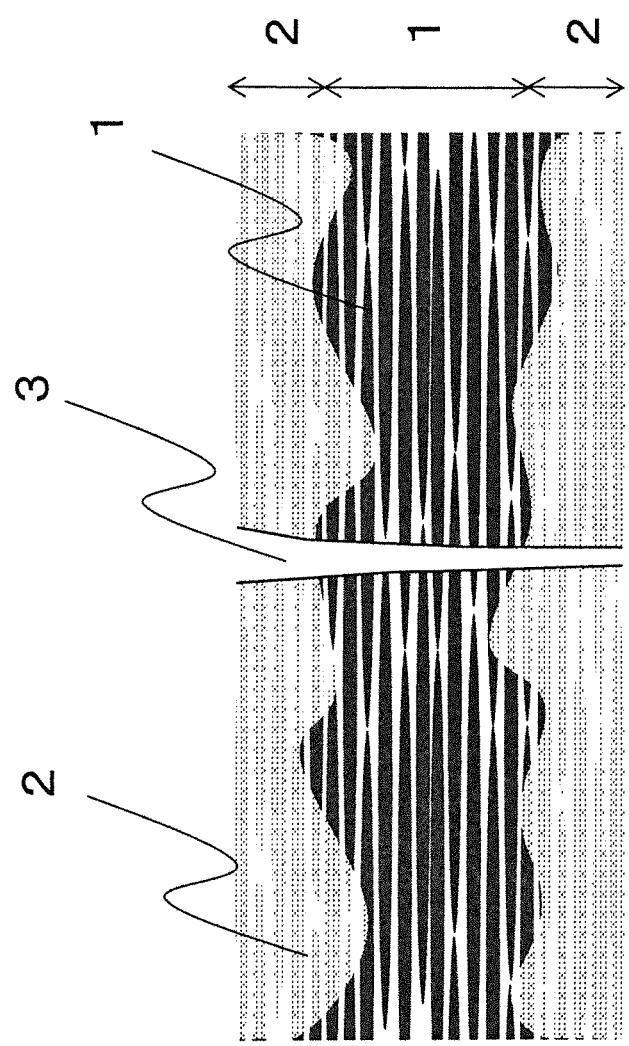
FIG. 1 shows a conceptual scheme of a typical cross section of our incised prepreg.

1: first layer in prepreg
2: second layer in prepreg
3: incision
4: incised prepreg
5: fiber direction
6: direction perpendicular to fiber
7: discontinuous incision
8: continuous incision
9: discontinuous oblique incision (positive angle from fiber direction)
10: discontinuous oblique incision (negative angle from fiber direction)
11: line of discontinuous incisions
12: L-shaped prepreg laminate
13: L-shaped single sided mold 14: inside diameter of corner part
15: local cross section of L-shaped member
16: blade
17: tape-like support A
18: tape-like support B

DETAILED DESCRIPTION

With the aim of providing an intermediate base material that is high in formability into a three dimensional shape and unlikely to generate voids even in a low pressure molding process and serves to produce moldings (fiber reinforced plastic material) having good mechanical characteristics, a low variation therein, and high surface quality, we found that by making a plurality of incisions, forming a deaeration path in an antiplane direction, and applying discontinuous reinforcement fibers that act to increase the conformity to a three dimensional shape to prevent bridging, we can depress generation of creases and voids.

Specifically, our prepreg includes a layer containing reinforcement fiber impregnated with a resin composition, the prepreg being an incised prepreg having a plurality of incisions, at least partly formed of reinforcement fibers with a fiber length (L) of 10 to 300 mm, and having a reinforcement fiber content by volume Vf of 45% to 65%.

If a prepreg laminate in the form of a stack of a plurality of prepreg plies is molded after forming in a three dimensional shape, a difference in circumference between the top and bottom surfaces occurs in a curved part such as a curved corner because the thickness of the molded fiber reinforced plastic material is smaller than that of the prepreg laminate. If the reinforcement fiber in the prepreg is constituted only of continuous fibers, the prepreg cannot be stretched in the direction of the reinforcement fiber and, therefore, bridging may occur near the tensioned surface, i.e., either the top or the bottom surface to eliminate the difference in circumference, moving the neutral axis of bending toward the tensioned surface. Accordingly, it is highly likely that a compression load is applied almost over the entire surface of the prepreg laminate and a plurality of layers are buckled together to cause creases. In addition, reinforcement fibers located immediately under the part where bridging occurs bear the load during the molding process and, therefore, the pressure is not efficiently transferred, allowing voids to be generated easily. This tendency is more noticeable in low pressure molding processes such as autoclaving and oven molding that uses a vacuum pump alone as a means of compression than in high pressure molding processes such as press molding.

A plurality of incisions are provided to secure a gas flow channel in the antiplane direction during molding and make the reinforcement fibers discontinuous to allow the prepreg to stretch in the fiber direction, and this prevents bridging from occurring during the molding of curved parts of the prepreg laminate, leading to decreased numbers of creases and voids. The degree of stretching of the incised prepreg in the fiber direction during the molding process can be evaluated on the basis of the incised prepreg extension rate in the molding process described later. Regardless of the size of moldings, the incisions enable deaeration in the antiplane direction, i.e., through the shortest path and, accordingly, it may be controlled positively by providing incisions as required, for example, only in a part where deaeration is desired such as concave part where the pressure does not work effectively.

If the reinforcement fibers cut by the incisions have fiber lengths L of 300 mm or less, it secures a required number of deaeration paths for gas in the antiplane direction during the molding process and also works effectively to depress bridging. If L is 10 mm or more, the incisions are farther away from each other and a fiber reinforced plastic material molded from such an incised prepreg will have high strength because cracks will not join together easily when a load is applied. In view of the relation between the shape conformity during the molding process, the effect of depressing molding defects such as voids and the mechanical characteristics of the molded fiber reinforced plastic material, the fiber length L of the reinforcement fibers cut by the incisions is more preferably 20 to 300 mm. The fiber length L refers to the length of a reinforcement fiber segment cut by an arbitrary incision and a nearest incision in the reinforcement fiber direction (partner incision) as illustrated in FIGS. 2 to 6. Since scape of reinforcement fibers can occur when making an incision, long incisions may be made intentionally in some cases, resulting in reinforcement fibers having a fiber length shorter than the fiber length L of most reinforcement fibers, but such fibers preferably account for 5% or less.

It is preferable for the plurality of incisions to correspond to the positions where large shape deformation occurs in the prepreg laminate formed into a three dimensional shape.

Controlling the content by volume of the reinforcement fiber Vf at 65% or less causes slipping of reinforcement fibers near incisions, depresses bridging effectively, and ensures shape conformity and the effect of depressing molding defects such as voids. From such a point of view, Vf is more preferably 60% or less. Furthermore, a smaller Vf depresses bridging more effectively, but a Vf of less than 45% makes it difficult to ensure good mechanical characteristics required for structural members. From such a point of view, Vf is more preferably 55% or more. The content by volume of the reinforcement fibers Vf can be determined from processed optical microscope images of a prepreg cured by the procedure described in Example 1.

It is preferable for the reinforcement fibers in an incised prepreg to be partially impregnated with a resin composition (or partially left unimpregnated) to further improve the deaeration performance during the molding process. Specifically, as illustrated in FIG. 1, such a prepreg is composed mainly of a first layer of reinforcement fibers and a second layer containing reinforcement fibers impregnated with a resin composition. The use of an incised prepreg in which reinforcement fibers are partially impregnated with a resin composition allows the parts containing unimpregnated reinforcement fibers in the prepreg to act as in-plane flow channels that help air confined between layers of the incised prepreg during the lamination step and gases such as volatile components of the incised prepreg, to be discharged out of the incised prepreg (flow channels for such gases are referred to as deaeration paths). If the impregnation rate is too low, on the other hand, separation between reinforcement fibers and the resin composition can occur and the incised prepreg can be broken into two in an unimpregnated part during the incised prepreg lamination step in some cases, leading to an inferior workability, or voids may be left if the impregnation time is not sufficiently long in the molding process. Accordingly, the impregnation rate is preferably 10% to 90%. From such a point of view, a preferable upper limit of the impregnated rate is 70%, and a more preferable upper limit is 50%, whereas a preferable lower limit of the impregnated rate is 20%. When a thermosetting resin is adopted, the first layer and the second layer in the incised prepreg and the impregnation rate of the resin composition can be examined by gradually curing the incised prepreg at a low temperature where resin flow does not occur and observing a cross section of the cured prepreg by microscopy, whereas in a thermoplastic resin, observation of a cross section is performed at room temperature. Each second layer is impregnated with resin from the surface into the interior of the incised prepreg, whereas the first layer, which is located between the second layers, is free of resin impregnation. The impregnation rate of the resin composition is calculated as the proportion of the cross section of the reinforcement fibers impregnated with a thermosetting resin composition to the total cross section of the reinforcement fiber. Since deaeration during the molding process generally tends to become more difficult as the size of moldings increases, the use of an incised prepreg with a controlled impregnation rate is preferred because the void fraction can be reduced easily by combining the in-plane deaeration paths with the antiplane deaeration paths produced by the incisions.

It is preferable that a second layer containing reinforcement fibers impregnated with a resin composition is provided on each surface of the first layer formed of reinforcement fibers. The existence of resin on both surfaces during the lamination step fixes the prepreg plies easily.

Preferably, a second layer includes a type A layer formed of reinforcement fibers impregnated with a thermosetting resin composition and a type B layer containing particles or fibers of a thermoplastic resin, and the type B layer faces a surface of the incised prepreg. The type B layer may not necessarily contain reinforcement fibers as long as the second layer as a whole contains reinforcement fibers impregnated with a resin composition. Thus, the type B layer may consist only of a thermosetting resin composition and particles or fibers of a thermoplastic resin. The use of a thermosetting resin is preferred because it not only generally has a lower viscosity than thermoplastic resins and can penetrate easily into the reinforcement fibers, but also can be molded at lower temperatures and requires less investment in molding equipment. In the fiber reinforced plastic material produced by laminating and molding prepreg plies, the type B layer forms a resin interlayer between reinforcement fiber layers in each layer. As a result, cracks are guided into the flexible resin interlayer when an antiplane impact load is applied, and the existence of a thermoplastic resin works to increase the ductility and depress layer separation, thereby ensuring a high residual compression strength after the antiplane impact. Thus, the material is suitable for main structures of aircraft and the like that require high safety. It is only necessary for the incisions to cut the reinforcement fibers, and they may penetrate through the entire prepreg in the thickness direction or penetrate through only the first layer and the type A layer in the second layer.

In addition, the incised prepreg is preferably such that when one surface of the incised prepreg is brought into contact with water under a pressure of 10 cm water column or less at room temperature, the water starts to bleed out from the other surface within one minute. The effectiveness of the incisions functioning as deaeration paths can be determined by observing whether a low viscosity liquid such as water bleeds out even under a slight pressure difference. A typical procedure is as follows. Specifically, a glass with a depth of 10 cm or less is filled with water and an incised prepreg is put on top in an airtight manner, followed by turning the glass upside down. If a piece of cloth of dark color or the like that changes color when water bleeds out is put on the surface of the incised prepreg in advance, evaluation can be performed by determining whether water bleeds out within one minute. Room temperature is 25° C.

Furthermore, the incised prepreg is preferably such an incised prepreg in which the thickness (A) of an incised prepreg laminate formed by laminating incised prepreg plies by the procedure as described below is larger by 5% to 50% than the thickness (B) of the fiber reinforced plastic material formed by heating and solidifying the incised prepreg laminate (hereinafter, the percentage proportion of the difference between the thickness (A) and the thickness (B) to the thickness (B), namely, $(A-B)/B \times 100$, is referred to as thickness change). In a method of forming an incised prepreg laminate, a single sided mold and a bag film are combined to form a closed space and a laminate of stacked incised prepreg plies is placed in the closed space, followed by evacuating the closed space at room temperature so that the laminate of stacked incised prepreg plies is compressed by the pressure difference from the atmospheric pressure. The difference between the thickness of the incised prepreg laminate and that of the fiber reinforced plastic material produced by heating and solidifying the former is attributed to the internal gaps, and the change in thickness is small when significant internal gaps remain in the fiber reinforced plastic material after the heating and solidification step whereas the change in thickness is large when there remain no internal gaps. During the molding process, gases such as air and volatile components of the prepreg are removed through these internal gaps to allow the reinforcement fibers to be impregnated with resin, while internal gaps are reduced by compression and, therefore, the change in thickness can serve as an indicator of the ease of deaeration during the molding process. If the incised prepreg laminate does not contain internal gaps of an appropriate size, gases will not be removed in the molding process and will be left as voids in the final moldings, whereas on the other hand, if the internal gaps in the incised prepreg laminate are too large, resin impregnation may not proceed completely during the molding step or, in a curved incised prepreg laminate, excessively large internal gaps will cause an excessively large difference in circumference between the top and bottom surfaces, leading to creases, voids and the like. Thus, the change in thickness is preferably 5% to 50%, more preferably 15% to 30%.

Furthermore, the incised prepreg is preferably such that curved parts of a fiber reinforced plastic material produced by applying a curved surface forming technique as described below to a stack of 16 to 32 plies of the incised prepreg are substantially free of voids.

Curved Surface Forming

A closed space is formed between a female cavity having a curved surface with a curvature radius of 10 mm and a bag film and a laminate of 16 to 32 incised prepreg layers is placed in the closed space, followed by evacuating the closed space so that the incised prepreg laminate is compressed by the pressure difference from the atmospheric pressure. In this step, heating is performed simultaneously to solidify the laminate to form a fiber reinforced plastic material.

Significant void formation may occur if forming is achieved by pressing a prepreg against the cavity wall because the pressure on the curved surface is less than that on the planes and, in addition, the applied pressure may be inevitably small when forming is performed by a pressure difference from atmospheric pressure produced by a vacuum pump. In particular, when 16 to 32 layers are stacked and formed into a shape with a curvature radius of 10 mm or less, it may be difficult to depress void generation if incisions to eliminate the difference in circumference between the top and bottom surfaces in an incised prepreg laminate are not available in combination with antiplane deaeration paths by incisions and in-plane deaeration paths in the unimpregnated parts working for deaeration. For this evaluation, a curved surface forming test should preferably be performed with 24 layer laminates from the viewpoint of the balance between the accuracy of evaluation and lamination workability. To determine the void fraction, a cross section of a fiber reinforced plastic material was polished and observed by optical microscopy, and binarized data were used to calculate the proportion of the area of voids to the cross section of the fiber reinforced plastic material. Being substantially free of voids means a void fraction of 0.1% or less.

It is preferable for at least some parts of the incised prepreg to have a plurality of discontinuous incisions crossing the reinforcement fibers, and when projected in the direction perpendicular to the reinforcement fibers in the plane of the incised prepreg, the incisions preferably have projected lengths Ws of 30 µm to 1.5 mm. From the viewpoint of formability, it is also preferable that in any region surrounded in the reinforcement fiber's length direction by discontinuous incisions, substantially all reinforcement fibers are cut by the incisions. It is defined here that in a state where substantially all reinforcement fibers are cut by incisions, the unincised reinforcement fibers account for 5% or less (hereinafter the same). If all reinforcement fibers are cut by pairs of incisions into segments with a predetermined length or less, it ensures conformity to a three dimensional shape and prevents bridging. A smaller Ws value is likely to lead to a decrease in the number of reinforcement fiber segments cut by one incision to ensure an increased strength. In particular, a Ws of 1.5 mm or less is expected to ensure a large increase in strength. If Ws is less than 30 µm, on the other hand, it will be difficult to control the positions of incisions and also difficult for all reinforcement fibers to be cut by incision pairs to a predetermined length or less, possibly leading to bridging during the molding process. "The projected length Ws of an incision projected in the direction perpendicular to the reinforcement fibers" is the length of an incision projected in the perpendicular direction (fiber orientation direction 5) in the plane of the incised prepreg to a plane of projection that is in the perpendicular direction (fiber's perpendicular direction 6) to the reinforcement fibers as illustrated in FIGS. 2, 4, 5 and 6.

Figure 3:
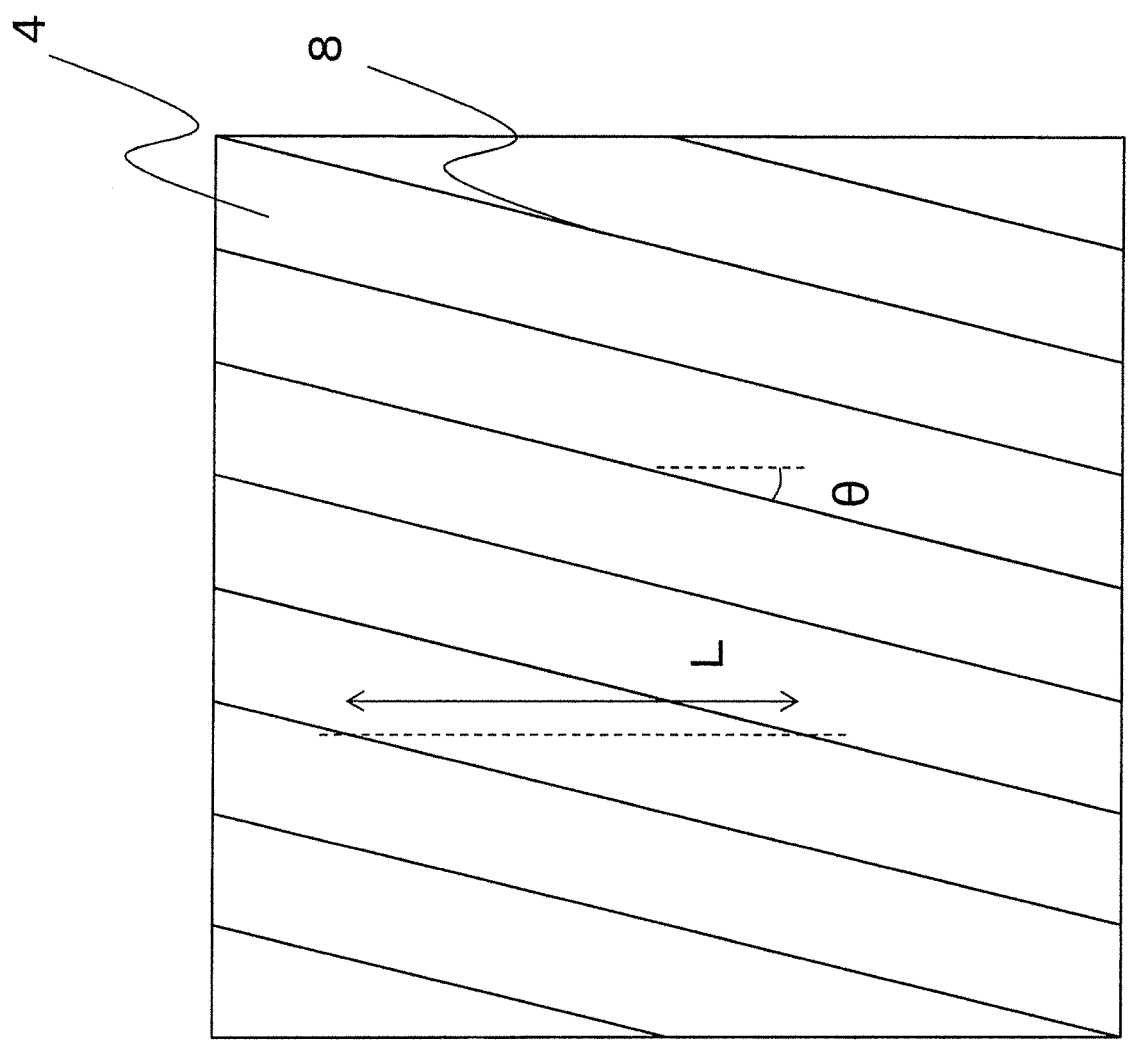
FIG. 3 shows a conceptual scheme of a typical cut pattern of our incised prepreg.
Figure 3:
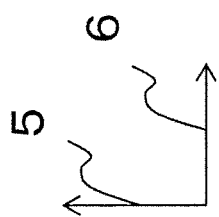
Figure 4:
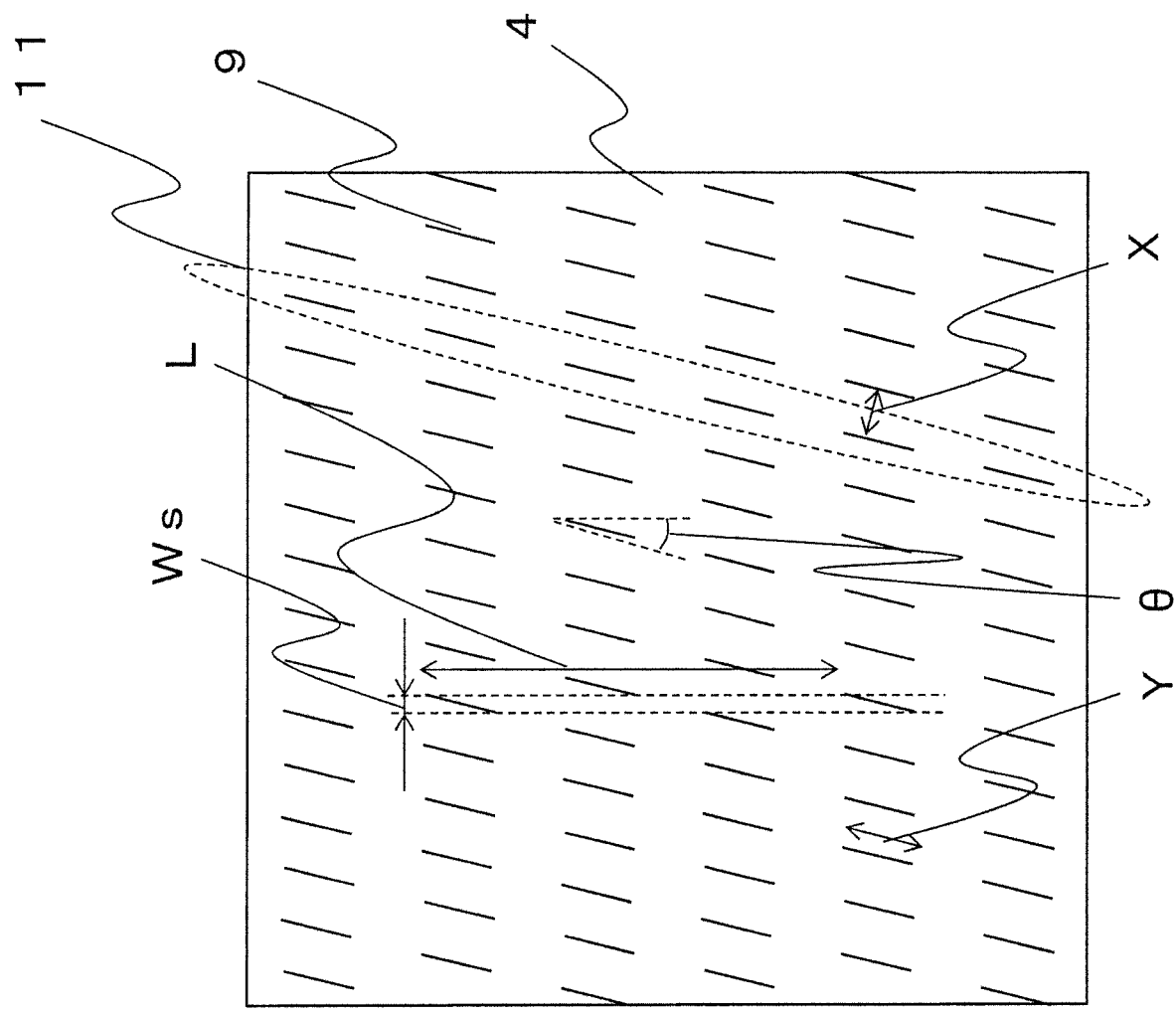
FIG. 4 shows a conceptual scheme of a typical cut pattern of our incised prepreg.
Figure 4:
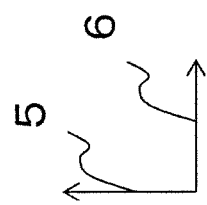
Figure 5:
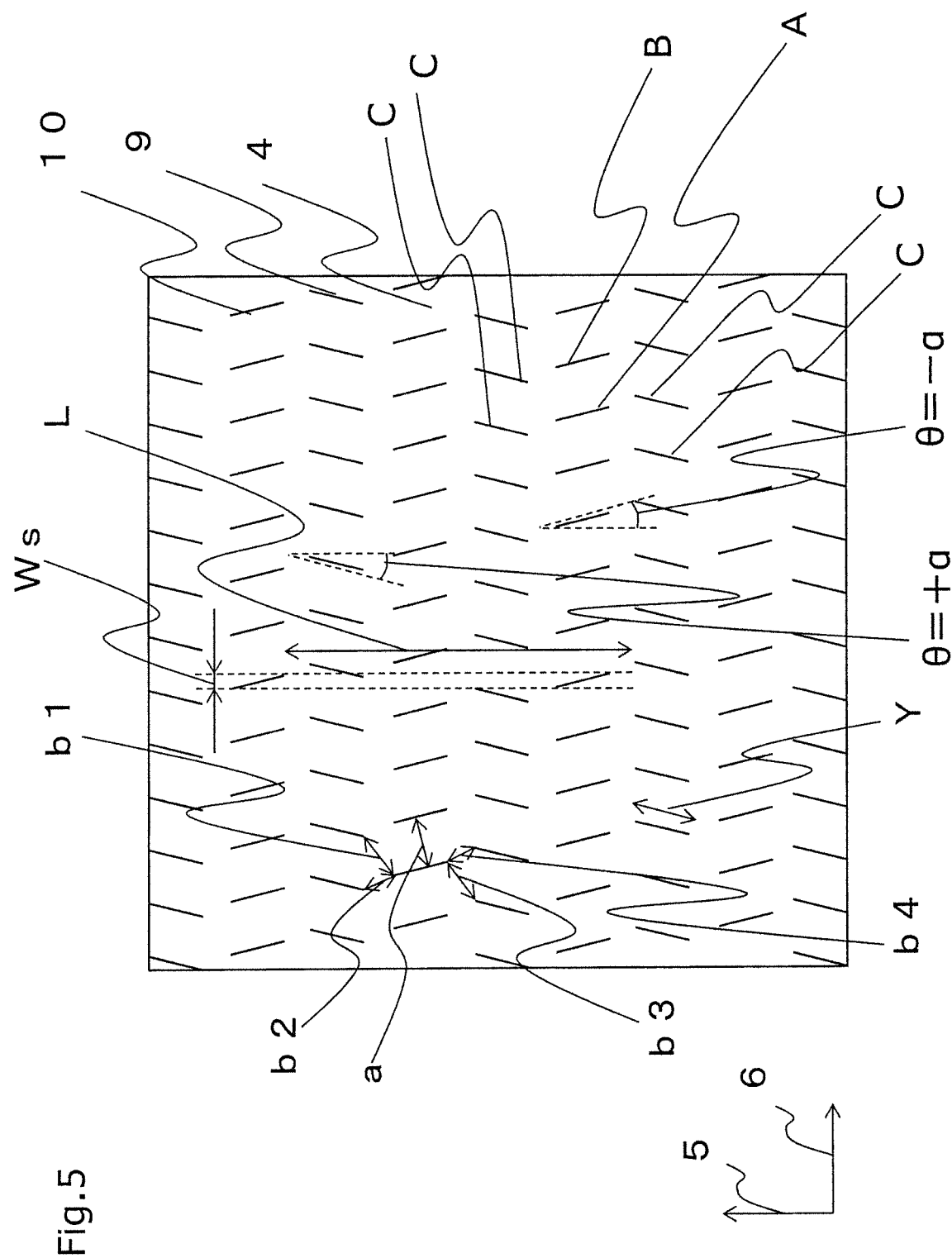
FIG. 5 shows a conceptual scheme of a typical cut pattern of our incised prepreg.
Figure 6:
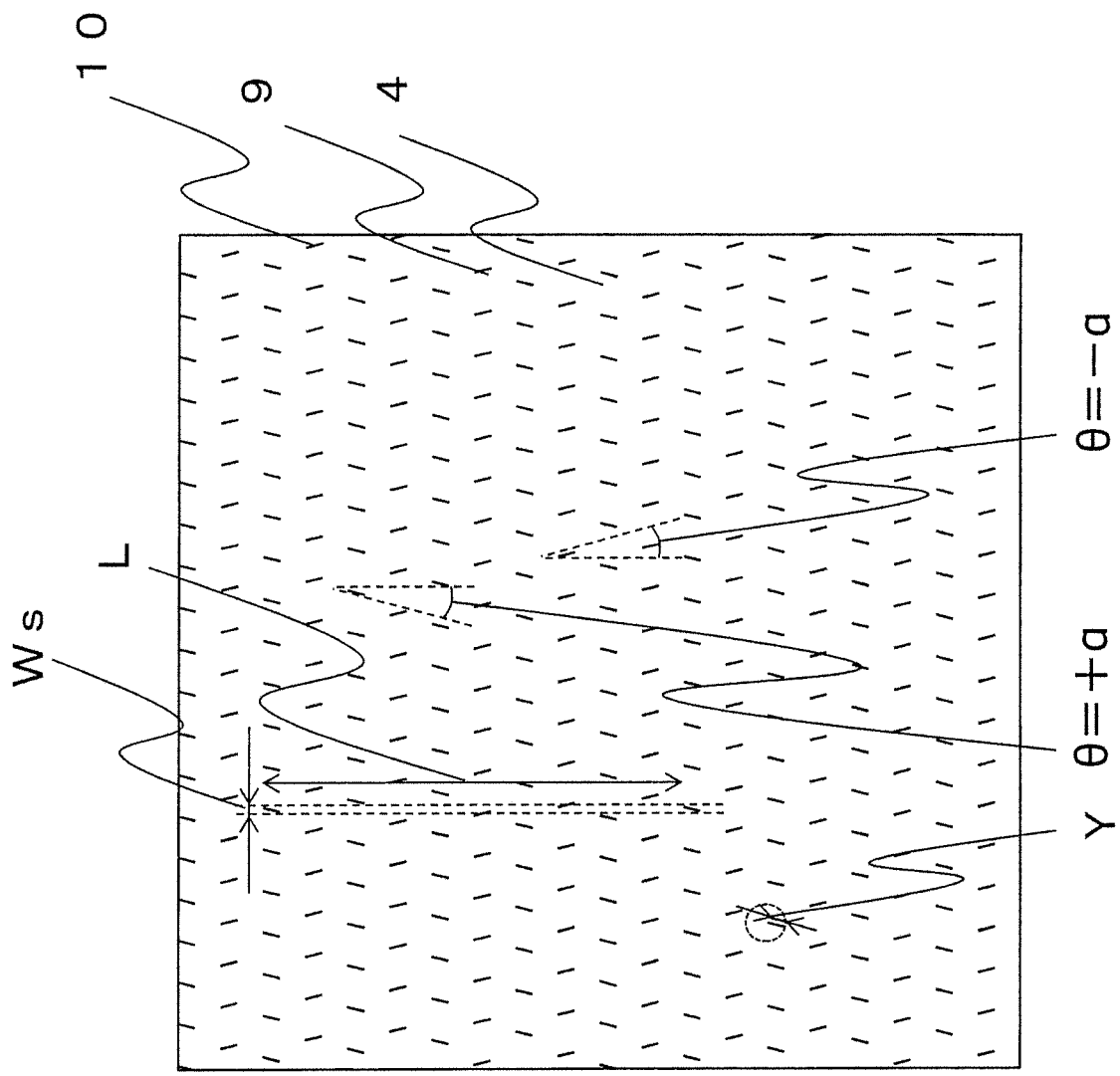
FIG. 6 shows a conceptual scheme of a typical cut pattern of our incised prepreg.

For the incised prepreg, the absolute value of θ, which is the angle between the incisions and reinforcement fibers, is preferably 2° to 25°. In continuous incisions as illustrated in FIG. 3, the fiber length L can be controlled at a constant value to ensure reduction in the variation in mechanical characteristics and three dimensional shape conformity. In discontinuous incisions as illustrated in FIGS. 4 to 6 where the incisions are in an oblique direction, the projected length Ws is less than that of the incision length Y and, therefore, very small incisions of 1.5 mm or less can be made stably in an industrial process. If continuous incisions are made, prepreg plies will not become loose easily in the lamination step, allowing the prepreg to have a high handleability. In particular, the mechanical characteristics, tensile strength among others, will be improved considerably if the absolute value of θ is 25° or less and from this point of view, the absolute value of θ is more preferably 15° or less. If the absolute value of θ is smaller than 2°, on the other hand, it will be difficult to make incisions stably. Specifically, as the angle of the incisions from the reinforcement fibers decreases, reinforcement fibers tend to escape easily from the blade when making incisions. In FIG. 4, for example, the minimum distance between the lines of incisions, 11 s, decreases, making it more difficult to make incisions while maintaining a high positioning accuracy for the incisions. From such a point of view, the absolute value of θ is preferably 5° or more.

For the incised prepreg, a preferable cutting pattern contains a plurality of discontinuous incisions crossing the reinforcement fibers at least in a part of the incised prepreg as illustrated in FIG. 4, where the discontinuous incisions are in a linear shape and in parallel to each other to form lines, 11, with a distance X of 1 to 5 mm between them. When all fiber segments have an equal length L, the minimum distance between incisions is maximized when linear incisions are made in the same direction. Furthermore, incisions may be made by moving a rotary type round perforation blade along a straight line or applying a pulsed laser beam from laser processing equipment along a straight line at a high speed to make incisions according to the pulse periodicity, thus ensuring a high incision productivity.

For the incised prepreg, another preferable cutting pattern contains a plurality of discontinuous incisions crossing the reinforcement fibers at least in a part of the incised prepreg as illustrated in FIG. 5, where the discontinuous incisions are in a linear shape, all incisions having a substantially equal absolute θ value, and about a half of the incisions having an angle of the opposite positive/negative sign to that of the other half "A substantially equal absolute θ value" means that the variation in the angle is within ±1°, and "about a half" means a percentage proportion of 45% to 55% by number (hereinafter the same). If incised plies have oblique incisions aligned in the same direction when prepared, they will be in different directions when looking from one side or from the other side in the incised ply lamination step even if the fiber direction is the same in all prepreg plies. The fiber reinforced plastic material production process, therefore, may require an additional operation to control the lamination procedure so that the incisions are always in the same direction or so that a half of the plies have the same fiber direction as and a different incision direction from the other half. Thus, if a half of the incisions and the remainders in a cutting pattern have a positive or a negative inclination angle from the fiber direction, respectively, with a substantially equal absolute angle value, lamination can be carried out by the same procedure as for normal continuous fiber prepregs.

Preferably, a randomly selected incision A as illustrated in FIG. 5 has neighboring incisions of which four or more incisions, C, have an angle θ that is different in sign from the incision A, but has a smaller minimum distance from the incision A than the incision B that is closest to the incision A among those having an angle θ of the same sign. When formed in conformity to a three dimensional shape, the movement of the fiber ends around incisions in a prepreg depends on the relation with the incision angle and fiber direction and accordingly, the in-plane isotropy in molded products, seen from a macroscopic point of view, is guaranteed by the fact that the incisions adjacent to each other have an identical shape and extend in the opposite directions.

Further preferably, the incised prepreg contains a plurality of discontinuous incisions crossing the reinforcement fibers at least in a part of the incised prepreg as illustrated in FIG. 6, where the discontinuous incisions are in a linear shape and have a substantially equal length Y and the minimum distance between incisions adjacent to each other is longer than the incision length Y. "A substantially equal length" means that the variation in length is within ±5% (hereinafter the same). From the viewpoint of mechanical characteristics, a fiber reinforced plastic material is destroyed when incisions, that is, discontinuity points of fibers, are connected to each other by cracks. A cutting pattern in which incisions are away from each other in in-plane directions at least depresses the connection of cracks located in the same plane, which works to improve strength.

Still further preferably, the incised prepreg contains a plurality of discontinuous incisions crossing the reinforcement fibers at least in a part of the incised prepreg where the discontinuous incisions are in a linear shape and have a substantially equal length Y and the distance between the adjacent incisions in the same line is more than three times as long as Y. When incisions are located on the same straight line, damage attributed to incisions is likely to occur on the extension of incisions and, accordingly, cracks closer to each other in particular are connected more easily. Therefore, crack connection is depressed and strength is improved by maximizing the distance between incisions in the same straight line. If discontinuous incisions are made along a straight line with short distances between them, the incisions in the final molded product are more likely to be recognized as a pattern of discontinuous line segments, whereas if there are large distances between the incisions, they are less likely to be recognized as a pattern, leading to good surface quality. "The existence of incisions located on the same straight line" means that the angle between the straight line drawn by extending the incisions and that drawn by connecting the nearest points between the particular incisions is 2° or less.

Figure 8:
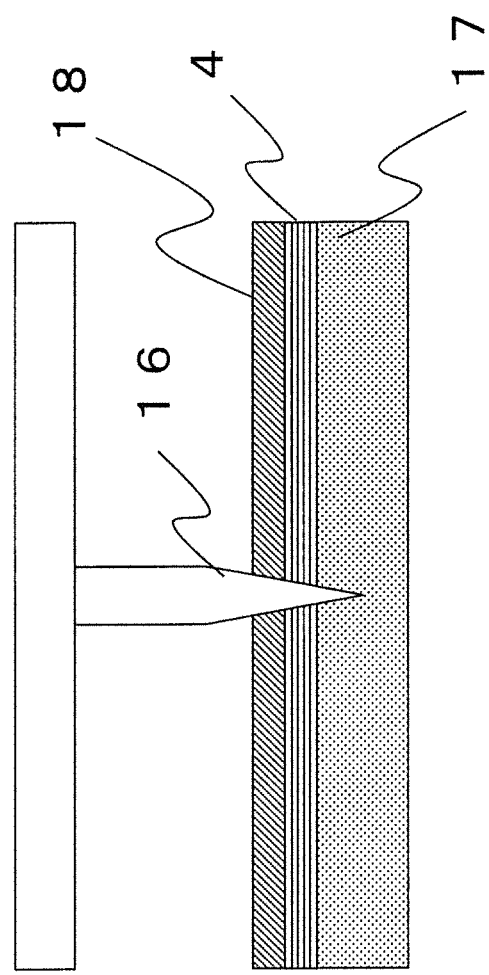
FIG. 8 shows a conceptual scheme illustrating the positional relation between the blade and the tape-like support during the production process of our incised prepreg sheet.

The incised prepreg is preferably attached in close contact with a tape-like support. A combination of an incised prepreg and a tape-like support attached closely to at least one surface thereof is referred to as an incised prepreg sheet. Specifically, the incised prepreg sheet includes an incised prepreg laminated with a tape-like support A in contact with one of the surfaces thereof, the tape-like support A also having incisions in the 5% to 75% region from the surface in contact with the incised prepreg, the incisions continuing from the corresponding incisions in the incised prepreg. The tape-like support may be paper such as kraft paper, polymer film such as of polyethylene and polypropylene, or metal foil such as of aluminum, and its surface may be covered with a silicone or Teflon (registered trademark) based releasing agent or metal deposition to improve the releasability from resin. As illustrated in FIG. 8, it is preferable for each incision to be made, by using the so-called half-cut technique to not pass through the tape-like support A in the thickness direction after passing through the prepreg to allow the tape-like support A to grip the incised prepreg. This allows the tape-like support A to work to prevent deformation of the incised prepreg even when it has many incisions, leading to a large improvement in the handleability of the incised prepreg. In this instance, the degree of penetration of the blade end into the prepreg is preferably 5% to 75%, more preferably 10% to 50%, in the thickness direction of the tape-like support A so that the blade can work effectively without leaving incomplete incisions even when worn after repeated cutting and that the tape-like support A can maintain adequate hardness required to grip the incised prepreg.

The incised prepreg sheet may include an incised prepreg laminated with a tape-like support B in contact with the surface thereof that is not covered with the tape-like support A, wherein the tape-like support B contains incisions penetrating therethrough in the thickness direction and continuing to the corresponding incisions in the incised prepreg. When the prepreg is of a thermosetting resin with a high tackiness, the existence of a tape-like support B between the blade and the prepreg in the incision formation step controls the adhesion of the prepreg to the blade and prevents fusion between prepreg sheets in the incised prepreg sheet wind-up step. This example is particularly preferred for an incised prepreg sheet in which incisions are significantly away from each other. In the cutting patterns shown in FIGS. 3, 4, and 5, for example, where the incisions are continuous or the incisions are located close to each other, the tape-like support B may be torn as it is removed, leading to poor incised prepreg handleability, whereas the tape-like support B can be removed without tearing if the incisions are significantly away from each other in a cutting pattern as shown in FIG. 6. The coexistence incisions with positive and negative angles also work to depress joining fractures because they pull the tape-like support B in different directions. In addition, the tape-like support attached to the incised side of a prepreg may be discarded after the incision step, followed by attaching a new tape-like support to prevent adhesion between prepreg sheets during the prepreg sheet wind-up step, but this requires an operation of attaching a new tape-like support and incurring an increased cost.

The reinforcement fiber may be glass fiber, Kevlar fiber, carbon fiber, graphite fiber, boron fiber or the like. Of these, carbon fiber is preferable from the viewpoint of specific strength and specific modulus. Examples of reinforcement fiber materials with different shapes and orientations include long fibers aligned in one direction, bidirectional woven fabrics, polyaxial woven fabrics, nonwoven fabric materials, mats, knitted fabrics, and braided cords. Any of these may be selected depending on the purpose and field of application. In particular, those in which fibers are aligned in one direction are preferable because the packing of fibers is in an efficient manner to ensure an improved Vf, allowing the mechanical characteristics to be displayed to a very high degree.

The resin composition to be used to impregnate the second layer may be of either a thermoplastic resin or a thermosetting resin. Examples of the thermoplastic resin include, for example, polyamide (PA), polyacetal, polyacrylate, polysulfone, ABS, polyester, acrylic, polybutylene terephthalate (PBT), polycarbonate (PC), polyethylene terephthalate (PET), polyethylene, polypropylene, polyphenylene sulfide (PPS), polyether ether ketone (PEEK), polyetherimide (PEI), polyether ketone ketone (PEKK), liquid crystal polymers, polyvinyl chloride, polytetrafluoroethylene, other fluorine based resins, and silicone. In particular, PA, PPS, PEEK, PEI, and PEKK are preferable in view of the adhesiveness to reinforcement fiber and the mechanical characteristics as matrix resin. Of these, PEEK and PEKK are preferable when fiber reinforced plastic materials with good mechanical characteristics are required, and PA and PPS are preferable when reduced cost is sought.

There are no specific limitations on the type of thermosetting resin as long as the resin used can undergo a crosslinking reaction when heated to form an at least partially three dimensional crosslinked structure. Examples of such thermosetting resin include unsaturated polyester resin, vinyl ester resin, epoxy resin, benzoxazine resin, phenol resin, urea resin, melamine resin, and polyimide resin. Modified forms of these resins and blends of two or more thereof may also be used. Furthermore, these thermosetting resins may be self-curable by heating or may contain a curing agent, a curing accelerator or the like.

Of these thermosetting resins, epoxy resin is used favorably because of having a good balance among heat resistance, dynamic characteristics, and adhesiveness to carbon fiber. In particular, those epoxy resins produced from an amine, a phenol, or a compound having a carbon-carbon double bond used as precursor are preferred. Specifically, preferable examples include aminophenol type epoxy resins, glycidyl aniline type epoxy resins, and tetraglycidyl amine type epoxy resins that are produced from amines as precursors. The glycidyl amine type epoxy resins include modifications such as tetraglycidyl diaminodiphenyl, triglycidyl-p-aminophenol, and triglycidyl aminocreosol. The use of a tetraglycidyl amine type epoxy resin with an average epoxide equivalent weight (EEW) of 100 to 115, i.e., a high purity tetraglycidyl amine type epoxy resin, or an aminophenol type epoxy resin with an average EEW of 90 to 104, i.e., a high purity aminophenol type epoxy resin, is preferred to produce a fiber reinforced composite material with reduced contents of volatile components that can generate voids. Being high in heat resistance, tetraglycidyl diaminodiphenyl methane has been used favorably as resin for composite materials used in structure members of aircraft.

Glycidyl ether type epoxy resins produced from phenols used as precursors have also been used favorably as the thermosetting resin. Such epoxy resins include bisphenol A type epoxy resins, bisphenol F type epoxy resins, bisphenol S type epoxy resins, phenol novolac type epoxy resins, creosol novolac type epoxy resins, and resorcinol type epoxy resins. The use of a bisphenol A type epoxy resin with an average EEW of 170 to 180, i.e., a high purity bisphenol A type epoxy resin, or a bisphenol F type epoxy resin with an average EEW of 150 to 65, i.e., a high purity bisphenol F type epoxy resin, is preferred to produce a fiber reinforced composite material with reduced contents of volatile components that can generate voids.

Being low in viscosity, a liquid state bisphenol A type epoxy resin, bisphenol F type epoxy resin, or resorcinol type epoxy resin should preferably be used in combination with another epoxy resin.

In addition, bisphenol A type epoxy resins in a solid state at room temperature (about 25° C.) generally form cure resin having a structure with a lower crosslink density, compared to bisphenol A type epoxy resins in a liquid state at room temperature (about 25° C.) and, accordingly, the cured resin will be lower in heat resistance, but higher in ductility. Thus, it is preferable to use a combination of a glycidyl amine type epoxy resin, a liquid state bisphenol A type epoxy resin, and a bisphenol F type epoxy resin.

Epoxy resins having a naphthalene backbone tend to form a cured resin that is low in absorbability and high in heat resistance. In addition, biphenyl type epoxy resins, dicyclopentadiene type epoxy resins, phenol aralkyl type epoxy resins, and phenyl fluorine type epoxy resins are also preferred because they form cured resin with a low absorbability.

Urethane modified epoxy resins and isocyanate modified epoxy resins can be used favorably because they give cured resin with a high fracture toughness and a high elongation percentage.

These epoxy resins may be used singly or may be blended as appropriate. Addition of a bifunctional, trifunctional or higher functional epoxy resin to these resins is preferred because it gives both a prepreg with high workability and processability and a fiber reinforced composite with heat resistance under wet conditions. In particular, combinations of glycidylamine type and glycidyl ether type epoxy compounds can develop processability, heat resistance, and water resistance. Furthermore, the use of a blend of at least one epoxy resin in a liquid state at room temperature and at least one epoxy resin in a solid state at room temperature is effective in producing a prepreg having both a favorable degree of tackiness and drapability.

Phenol novolac type epoxy resins and creosol novolak type epoxy resins are high in heat resistance and low in absorbability and, accordingly, they form cured resins with high heat and water resistance. Use of these phenol novolac type epoxy resins and creosol novolac type epoxy resins makes it possible to adjust the tackiness and drapability of the prepreg while improving the heat and water resistance.

The epoxy resin curing agent to be used may be any compound having an active group capable of reacting with an epoxy group. A compound having an amino group, an acid anhydride group, or an azide group is suitable for use as a curing agent. More specifically, examples of the curing agent include, for example, dicyandiamide, diaminodiphenyl methane, various isomers of diaminodiphenyl sulfone, aminobenzoic acid esters, various acid anhydrides, phenol novolac resins, cresol novolac resins, polyphenol compounds, imidazole derivatives, aliphatic amines, tetramethyl guanidine, thiourea-added amines, methyl hexahydrophthalic anhydrides, other carboxylic anhydrides, carboxylic acid hydrazides, carboxylic acid amides, polymercaptan, boron trifluoride ethyl amine complexes, and other Lewis acid complexes. These curing agents may be used singly or a plurality thereof may be used in combination.

The use of an aromatic diamine as curing agent makes it possible to produce cured resin with high heat resistance. In particular, various isomers of diaminodiphenyl sulfone are most preferable because cured resins with high heat resistance can be obtained. The quantity of the aromatic diamine curing agent to be added is preferably stoichiometrically equivalent, but in some cases, the use of an equivalent ratio of about 0.7 to 0.9 produces a cured resin with high elastic modulus.

Also, the use of imidazole or a combination of dicyandiamide and an urea compound (for example, 3-phenol-1,1-dimethylurea, 3-(3-chlorophenyl)-1,1-dimethylurea, 3-(3,4-dichloro-phenyl)-1,1-dimethylurea, 2,4-toluene bisdimethylurea, 2,6-toluene bisdimethylurea) as curing agent serves to achieve a high heat resistance and water resistance even when curing at a relatively low temperature. When cured with an acid anhydride, it is possible to produce a cured resin having a relatively low absorbability as compared with curing with an amine compound. Furthermore, the use of a substance that can form one of these curing agents, for example, a micro-encapsulated substance, serves to provide a prepreg with enhanced storage stability that in particular undergo little change in tackiness and drapability when left to stand at room temperature.

The composition to be used may contain these epoxy resins and curing agents, part of which may be subjected to a preliminary reaction in advance. In some cases, this method can serve effectively for viscosity adjustment and storage stability improvement.

Furthermore, the resin composition to be used to impregnate the second layer may be a blend prepared by dispersing particles or fibers of a thermoplastic resin in a thermosetting resin or dissolving a thermoplastic resin in a thermosetting resin. In general, this thermoplastic resin is preferably one which contains a bond selected from the group consisting of carbon-carbon bond, amide bond, imide bond, ester bond, ether bond, carbonate bond, urethane bond, thioether bond, sulfone bond, and carbonyl bond, and it may be partially crosslinked.

In addition, the thermoplastic resin may or may not have crystallinity. It is preferable that at least one resin selected from the group consisting of polyamide, polycarbonate, polyacetal, polyphenylene oxide, polyphenylene sulfide, polyallylate, polyester, polyamide-imide, polyimide, polyetherimide, polyimide having a phenyl trimethyl indane structure, polysulfone, polyethersulfone, polyether ketone, polyether ether ketone, polyaramid, polyether nitrile, and polybenzimidazole, is blended and dissolved in the thermosetting resin.

Such thermoplastic resin may be a commercially available polymer or a so-called oligomer having a lower molecular weight than commercially available polymers. Such an oligomer is preferably one having a functional group capable of reacting with a thermosetting resin at a molecular end or in a molecular chain.

When a blend of a thermosetting resin and a thermoplastic resin is used, as compared to the use of either of them, a well-balanced base resin can be obtained because brittleness of the thermosetting resin is cancelled out by the ductility of the thermoplastic resin while the difficulty in molding the thermoplastic resin is cancelled out by the thermosetting resin. The ratio (by parts by mass) between the thermosetting resin and the thermoplastic resin is preferably 100:2 to 100:50, more preferably 100:5 to 100:35, to ensure a good balance.

It is essential for the type B layer in the second layer to contain particles or fibers of thermoplastic resin, thereby realizing high impact resistance. The particles and fibers of the thermoplastic resin may be of a thermoplastic resin selected from the list given previously for use as the thermoplastic resin component to be blended with a thermosetting resin. In particular, the use of polyamide is the most preferable because it has high ductility and can improve the impact resistance. In particular, of the various polyamides, nylon 12, nylon 6, nylon 11, nylon 6/12 copolymers, and a nylon based material partially modified with an epoxy compound into an IPN (interpenetrating polymer network) structure (semi-IPN nylon) as described in Example 1 of Japanese Unexamined Patent Publication (Kokai) No. HEI 01-104624 can realize particularly high strength adhesion with thermosetting resins. Accordingly, they are preferred because they produce fiber reinforced composite materials that have high interlayer peel strength in falling weight impact test, that is, have increased impact resistance.

When particles of a thermoplastic resin are to be used, the thermoplastic resin particles may have such a shape as spherical, non-spherical, porous, needle-like, whisker-like, and flake-like, but they preferably have a spherical shape because of their suitability in producing fiber reinforced composite materials that can have high impact resistance for the reason described below. The flow characteristics of the thermosetting resin will not deteriorate, ensuring good impregnation of a reinforcement fiber. The degree of interlayer peeling caused by a local impact (or local impact) in falling weight impact test (or local impact test) of fiber reinforced composite material will be further reduced and accordingly, when a stress is applied to the fiber reinforced composite material after undergoing an impact, the brittle region that contains interlayer peeling caused by the local impact and acts as a start point of destruction due to stress concentration will be smaller.

If thermoplastic resin fibers are to be used, the thermoplastic resin fibers may be either short fibers or long fibers. When short fibers are to be used, such fibers may be used in the same way as for particles as described in Japanese Unexamined Patent Publication (Kokai) No. HEI-02-69566 or may be used after processing into a mat. When long fibers are to be used, such fibers may be aligned parallel to the surface of the prepreg as described in Japanese Unexamined Patent Publication (Kokai) No. HEI-04-292634 or may be arranged randomly as described in International Publication WO/94/016003. Otherwise, the fibers may be processed into a woven fabric as described in Japanese Unexamined Patent Publication (Kokai) No. HEI-02-32843 or may be used in the form of a sheet type base material such as nonwoven fabric and knitted fabric as described in International Publication WO/94/016003. Furthermore, they may be used in the form of short fiber chips, chopped strands, milled fibers, or woven or knitted fabric produced by arranging spun short fibers parallelly or randomly.

To mold the incised prepreg, a good method is to stack a plurality of prepreg plies including incised prepreg plies and subjecting the stack to compression molding using a press. In another method, a prepreg laminate is placed between a single sided mold and a bag film to contain it in a closed space, which is then evacuated to produce a pressure difference from the atmospheric pressure so that the prepreg laminate can be compressed under heat, followed by additional compression and heating in an autoclave, or it may be solidified and molded only by a pressure difference from the atmospheric pressure produced by using a vacuum pump while heating by an oven and contact heating. In particular, the incised prepreg has the feature of depressing void formation to enable the production of a high quality fiber reinforced plastic material with a high yield even by a low pressure molding process and accordingly, the molding by a pressure difference from the atmospheric pressure produced by using a vacuum pump is preferred because of fewer restrictions on the size of moldings and smaller initial investment requirement.

When a prepreg laminate is placed between a curved-surfaced single sided mold and a bag film, it is more preferable that the incised prepreg plies be located in a part closer to the bag film away from the through-thickness center of the laminate. As the thickness of the prepreg laminate is decreased by compression and internal deaeration, the difference in circumference changes in the parts corresponding to the curved surfaces and therefore, formation of creases and voids can be depressed as a result of the incisions acting to release the bridging of fibers that may eliminate the difference in circumference. The friction coefficient between the mold and the prepreg is so high that their relative position is maintained during the molding step, whereas its movement is relatively easy near the bag film and accordingly, the formation of creases and voids can be depressed effectively as the bridging of fibers is released by the incisions located closer to the bag film away from the through-thickness neutral axis.

EXAMPLES

Our pre-pregs and sheets will now be illustrated in more detail with reference to examples, but it should be understood that this disclosure is not construed as being limited to the aspects described in these examples.

For the examples, the handleability of incised prepreg sheets, extension rate of incised prepreg in the molding process, surface quality, and mechanical characteristics were measured by the methods described below.

Handleability of Incised Prepreg Sheets Containing Polyethylene Film as Tape-Like Support B A specimen with size of 100 mm×100 mm was cut out of an incised prepreg sheet having a polyethylene film as tape-like support B and a piece of adhesive tape was pasted to a 10 mm×10 mm region containing a corner. The polyethylene film was removed by peeling the adhesive tape toward the opposite corner to determine the peelability of the polyethylene film. In Table 1, results are shown according to a three grade criterion depending on the number of operation steps required to remove the polyethylene film completely.

"The handleability of an incised prepreg sheet having a polyethylene film as tape-like support B" is referred to simply as "the handleability of an incised prepreg sheet."

A: The polyethylene film was removed in one step without tearing of the polyethylene film along an incision.

B: The polyethylene film was torn sometimes along an incision, and the 10 mm×10 mm piece of adhesive tape was replaced once to three times, to achieve complete removal of the polyethylene film.

C: The polyethylene film was torn frequently along an incision, and the 10 mm×10 mm piece of adhesive tape was replaced four or more times, to achieve complete removal of the polyethylene film.

Extension Rate of Incised Prepreg During Molding Process

An incised prepreg laminate having a size of 100 mm×100 mm and a lamination structure of [45/0/−45/90]2s was placed between metal plates heated in advance at 130° C. in a press and a pressure of 3 MPa was applied over the surface to perform press molding. The molding step was performed for 90 minutes to ensure complete curing of the incised prepreg, which was taken out in 90 minutes after the start of compression. The area of the molded product extended by press molding was divided by the area of the incised prepreg laminate before press molding to calculate the extension rate.

Surface Quality of Extension-Molded Product

Using incised prepreg plies, an incised prepreg laminate having a size of 300 mm×300 mm and a lamination structure of [+45/0/−45/90]2s was prepared and subjected to press molding under a pressure of 3 MPa in a press using a mold of 350 mm×350 mm to produce a fiber reinforced plastic material of 350 mm×350 mm. It was pressed at a temperature of 130° C., left for 90 minutes after the completion of the pressing step, taken out, and left to stand for cooling at room temperature. The surface quality of the molded fiber reinforced plastic material was determined by visual observation. In Table 1, a specimen was rated as A if substantially free of visible incisions, rated as B if containing visible incisions though containing few opened incisions, and rated as C if containing opened incisions and having poor surface quality.

Mechanical Characteristics of Extended Molded Product

Using incised prepreg plies, an incised prepreg laminate having a size of 300 mm×300 mm and a lamination structure of [+45/0/−45/90]2s was prepared and subjected to press molding under a pressure of 3 MPa in a press using a mold of 350 mm×350 mm to produce a fiber reinforced plastic material of 350 mm×350 mm. It was pressed at a temperature of 130° C., left for 90 minutes after completion of the pressing step, taken out, and left to stand for cooling at room temperature. A test piece of 25 mm×250 mm was cut out so that the 0-degree direction of the reinforcement fiber coincided with the length direction and subjected to tensile test according to the method set forth in ASTM D3039 (2008). Measurements were taken from five test pieces for each category and the average tensile modulus and the average tensile strength were calculated to represent each specimen.

Example 1

First, 13 parts by mass of PES5003P was added and dissolved in 60 parts by mass of Araldite (registered trademark) Y9655 and 40 parts by mass of Epon (registered trademark) 825 in a kneading machine, and then 20 parts by mass of a thermoplastic resin in the form of fine particles was mixed and kneaded, followed by mixing 45 parts by mass of Aradur (registered trademark) 9664-1 as a curing agent and kneading to prepare a thermosetting resin composition.

The fine particles were prepared according to the following procedure. Then, 90 parts by mass of transparent polyamide (trade name Grilamide (registered trademark)-TR55, manufactured by EMSER Werke), 7.5 parts by mass of an epoxy resin (trade name Epikote (registered trademark) 828, manufactured by Shell Petrochemical Co., Ltd.), and 2.5 parts by mass of a curing agent (trade name Tormide (registered trademark) #296, manufactured by Fuji Kasei Kogyo Co., Ltd.) were added to a solvent mixture containing 300 parts by mass of chloroform and 100 parts by mass of methanol to provide a uniform solution. Next, the uniform solution thus obtained was atomized by a spray gun for painting, mixed well, and sprayed to the liquid surface of 3,000 parts by mass of n-hexane to precipitate this solution. The precipitated solid material was separated by filtration, washed well with n-hexane, and then vacuum-dried at 100° C. for 24 hours to provide spherical particles of an epoxy modified nylon. The epoxy modified nylon particles were divided by a CCE classifier manufactured by CCE Technologies, Inc. The resulting fine particles had a 90% particle diameter of 28 μm and a CV value of 60%.

The thermosetting resin composition thus prepared was spread over a piece of release paper with a knife coater to produce two resin film sheets of 52 g/m². Then, the two resin film sheets thus prepared were attached to both sides of a unidirectionally aligned carbon fiber sheet (T800S-12K-10E) and impregnation with the resin was carried out at a roller temperature of 100° C. and a roller pressure of 0.07 MPa, followed by removing one of the pieces of release paper to prepare a unidirectional prepreg sheet containing release paper as tape-like support A and having a carbon fiber mass per unit area of 190 g/m² and a matrix resin fraction by mass of 35.4%. In Examples (and Comparative examples) given below, the simple term of "unidirectional prepreg" refers to one obtained by removing release paper from a unidirectional prepreg sheet.

The impregnation rate of the thermosetting resin composition in the resulting unidirectional prepreg was measure by the method described below. The prepreg was sandwiched between the surfaces of two smooth polytetrafluoroethylene resin plates and gradually cured for 10 days at 40° C. to prepare a plate-like cured prepreg. After curing, it was cut in the direction perpendicular to the adhered surfaces and the cross section was photographed by an optical microscope at a magnification of 50 times or more such that the top and bottom surfaces of the prepreg were contained in the field of view. The ratio by area of the resin-impregnated part to the cross section of the cured prepreg was calculated to determine the impregnation rate of the thermosetting resin composition in the prepreg. Results showed that the impregnation rate was 30%.

The resulting unidirectional prepreg sheet was inserted in the fiber direction into a roller cutter consisting of a cylinder and a blade attached thereon to make discontinuous linear incisions according to the cutting pattern given in FIG. 6. The fiber length L was 24 mm; θ was ±14°; and Ws was 0.25 mm. The same number of +14° incisions and −14° incisions were made in the prepreg in the unidirectional prepreg sheet. For all incisions, any pair of two incisions that were closest to each other had angles of the opposite positive/negative signs and any one incision was surrounded by four incisions each having an angle of the opposite sign and located closer than the closest one having an angle of the same sign. Furthermore, for any point on any incision, there were no neighboring incisions within the circle with a radius equal to the incision length Y. The line of incisions 11 contained incisions with an incision length Y of 1 mm aligned at intervals of 1 mm, and fibers were cut by pairs of incisions that were in alternate lines to prepare an incised prepreg sheet. The distance between neighboring incisions on the same straight line is about 10 times as long as Y. The cross section of the release paper was observed by an optical microscope after the incision formation step and we found that the incisions penetrated 40% of the thickness of the release paper. In Examples (and Comparative Examples) given below, the simple term of "incised prepreg" refers to one obtained by removing release paper from an incised prepreg sheet.

Water was poured in a glass to a 10 cm level at room temperature and an incised prepreg specimen was put on top of the glass. Then, a piece of brown cloth was put on top and the glass together with the specimen and cloth was turned upside down so that one of the surfaces of the incised prepreg came in contact with the water with a pressure of 10 cm water column. After one minute, the glass was turned to the original position and the cloth was observed. It was found that water leaked through incisions to change the color of the cloth.

Pieces of 25 cm×25 cm were cut out of the resulting incised prepreg in the 0° direction and eight of them were stacked such that their fiber directions coincided with each other. The stack was covered with a bag film and deaerated at 25° C. by a vacuum pump to a degree of vacuum of 3 kPa. Subsequently, the temperature was raised to 120° C. at a rate of 1.5° C./min and the temperature maintained for 180 minutes while controlling the vacuum at 3 kPa. Then, the temperature was raised to 180° C. at a rate of 1.5° C./min and the temperature maintained for 120 minutes to cure the prepreg, thereby preparing a flat plate of a fiber reinforced plastic material. A 10 mm×10 mm small piece containing a cross section substantially in the perpendicular direction to the fibers was cut out from a central part of the molded flat plate. It was embedded in epoxy resin and the cross section substantially in the perpendicular direction to the fibers was polished. The polished cross section was observed by an optical microscope at a magnification of 200 times or more and a 300 μm×300 μm region was taken as a 900 pixels×900 pixels digital image. The digital image obtained was binarized by giving 1 to the pixels corresponding to the fiber parts and giving 0 to the pixels corresponding to the resin parts, and the proportion of the number of the pixels corresponding to the fiber parts to the total number of pixels in the digital image was calculated to determine the proportion by area of the carbon fiber in the cross section substantially in the perpendicular direction to the fibers. Since the carbon fibers were aligned unidirectionally in the length direction, the proportion by area was assumed to represent the carbon fiber content by volume Vf. For two test pieces, digital images were taken from 10 randomly selected regions that did not overlap each other, and the average content by volume Vf of the carbon fiber was calculated at 56%.

Figure 7:
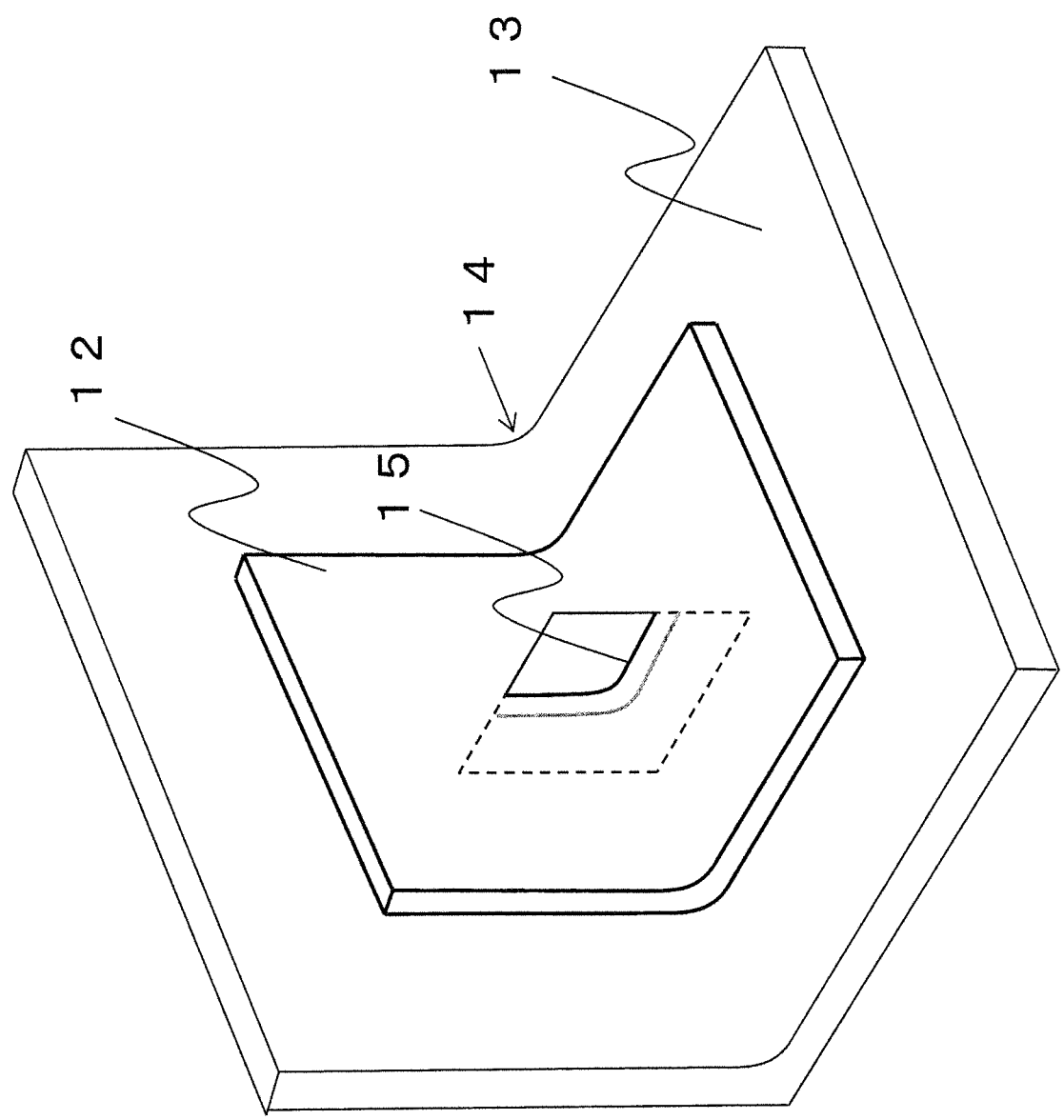
FIG. 7 shows a conceptual scheme of a typical fiber reinforced plastic material using our incised prepreg.

Next, 30 cm square pieces were cut out in the 0° and 45° directions from the incised prepreg obtained above. On an L-shaped single sided mold 13 having a curved part with a radius 14 of 10 mm as shown in FIG. 7, layers were stacked one on another in the form of a quasi-isotropic stack of [45/0/−45/90]3s to set up an L-shaped 24-ply incised prepreg laminate 12. Since it contained the same number of incisions having positive or negative incision angles, it was possible to stack the layers in the same way as for common continuous fiber-based prepregs without considering the relation between the incision angle and the fiber direction. Then, it was covered with a bag film and deaerated at 25° C. using a vacuum pump to a vacuum of 3 kPa to form an incised prepreg laminate, and its thickness was measured with a micrometer (5.5 mm). Subsequently, the temperature was raised to 120° C. at a rate of 1.5° C./min and the temperature maintained for 180 minutes while controlling the vacuum at 3 kPa. Then, the temperature was raised to 180° C. at a rate of 1.5° C./min and the temperature maintained for 120 minutes to cure the prepreg, thereby preparing an L-shaped member of a fiber reinforced plastic material. The thickness of the flat part was measured and found to be 4.5 mm, showing that the thickness of the incised prepreg laminate before the molding step was larger by 22% than that of the resulting fiber reinforced plastic material.

Curved specimens were cut out from a central region of the L-shaped member and their cross sections polished. Then, a curved specimen smaller than 10 mm length×10 mm width was observed by an optical microscope to provide binarized data, which were used to calculate the ratio by area between the fiber reinforced plastic material and voids. Results showed that the void fraction was 0.0%. We found that there were no creases.

Comparative Example 1

Except for using a unidirectional prepreg sheet prepared as in Example 1 but having no incision, the same procedure as in Example 1 was carried out to mold an L-shaped member, followed by measuring the void fraction in the curved part. Small voids were scattered in the layer and the void fraction was 1.5%. Creases were found in the region between the through-thickness center of the prepreg laminate and the surface facing the single sided mold.

Comparative Example 2

In the unidirectional prepreg sheet preparation step described in Example 1, impregnation with a thermosetting resin composition was carried out at a roller temperature of 140° C. and a roller pressure of 0.14 MPa. The impregnation rate was measured by the method described in Example 1 and found to be 100%. Subsequently, incisions were made as in Example 1, followed by molding an L-shaped member and measuring the void fraction of the curved part. Many voids were found to remain between layers and the void fraction was 2.0%. We found that there were no creases.

Comparative Example 3

Using a unidirectional prepreg as in Comparative example 2 that had an impregnation rate of 100% and contained no incision, the same procedure as in Example 1 was carried out to mold an L-shaped member, followed by measuring the void fraction in the curved part. Significant bridging of fibers was found with large voids formed immediately below, and the void fraction was 8.1%. Creases were found in the region between the through-thickness center of the prepreg laminate and the surface facing the single sided mold.

Example 2

Figure 2:
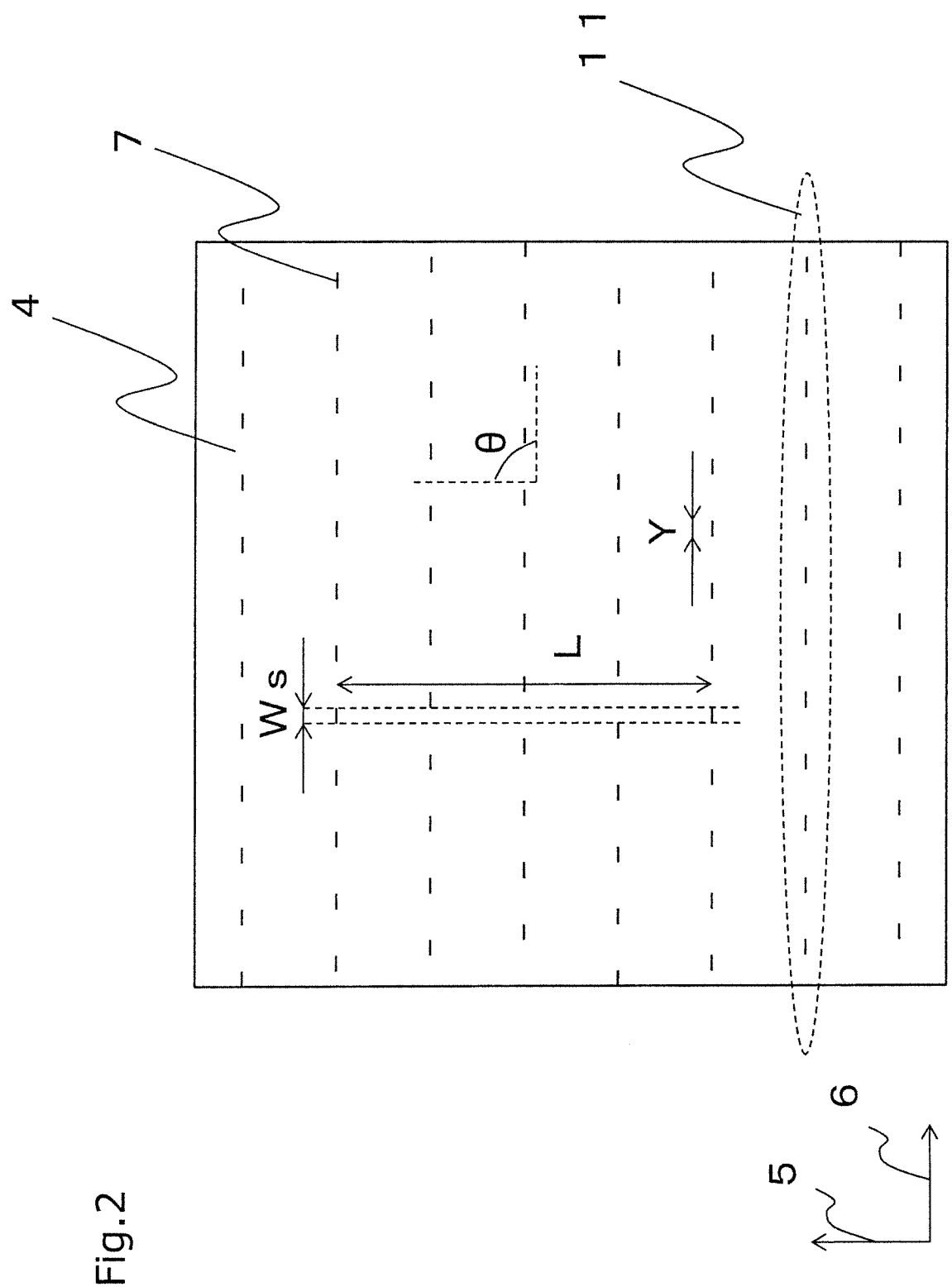
FIG. 2 shows a conceptual scheme of a typical cut pattern of our incised prepreg.

A prepreg sheet of Torayca (registered trademark) P3252 S-15 (reinforcement fiber: T700S, resin: 2592, volume content of reinforcement fiber: 56%, laminate with polyethylene film on one side and release paper on the other side) was inserted in the fiber direction into a roller cutter consisting of a cylinder and a blade attached thereon to produce an incised prepreg sheet. As shown in FIG. 2, it had discontinuous incisions crossing the reinforcement fibers in the perpendicular direction. In the cutting pattern, the projected length Ws of the incisions projected in the perpendicular direction to the reinforcement fibers was 1 mm, which was equal to the length Y of the incisions, and substantially all of the reinforcement fibers were cut into reinforcement fiber segments with a fiber length L of 24 mm in the regions defined by the discontinuous incisions in the length direction of the reinforcement fibers. A polyethylene film was in close contact with the surface of the prepreg sheet so that when an incision was made in the prepreg inserted in the fiber direction into the roller cutter, the end of the blade stops inside the release paper after penetrating though the polyethylene film and making an incision in the prepreg. After the incision formation step, the release paper cut in a direction across the incisions, and the cross section was observed by an optical microscope and we found that the incisions penetrated 40% of the thickness of the release paper.

The incised prepreg sheet had a high handleability, and it was possible to remove the polyethylene film in one step without tearing along incisions. The incised prepreg had an extension rate of 1.5 in the molding process, and opened incisions were noticeable in the surface quality test for extended moldings. Examination of the mechanical characteristics of the extension-molded product showed a tensile modulus of 46 GPa and a tensile strength of 670 MPa.

Example 3

Except for using a cutting pattern as shown in FIG. 3 which is characterized by continuous cutting with a fiber length L of 24 mm and an angle of 14° between incisions and reinforcement fibers, the same procedure as in Example 2 was carried out to prepare an incised prepreg sheet, followed by performing evaluation in the same way as above. Regarding handleability of the incised prepreg sheet, the polyethylene film underwent cutting into strips along incisions, and since only those pieces of the polyethylene film adhered to the adhesive tape were removable, much effort was required to remove all pieces of the polyethylene film adhered to the incised prepreg. The incised prepreg had an extension rate of 2.1 in the molding process, and not only opened incisions but also waves resulting from flowing fibers were seen in the surface quality test for the extension-molded product. Examination of the mechanical characteristics of the extension-molded product had a tensile modulus of 46 GPa and a tensile strength of 710 MPa.

Example 4

Except for using a cutting pattern as shown in FIG. 4 in which discontinuous incisions are made in a direction crossing the reinforcement fibers to form parallel lines of linearly aligned discontinuous incisions with a line-to-line distance of 2.9 mm, a fiber length L of 24 mm, a Ws of 1 mm, an angle θ of 14° between the reinforcement fibers and the incisions, the same procedure as in Example 2 was carried out to prepare an incised prepreg sheet, followed by performing evaluation in the same way as above.

Regarding handleability of the incised prepreg, tearing of the polyethylene film occurred sporadically along incisions, and pasting and peeling of adhesive tape had to be repeated a few times to remove the polyethylene film. The incised prepreg had an extension rate of 1.7 in the molding process, and although only few opened incisions were found, incisions were seen in a linear pattern in the surface quality test for extended moldings. Examination of the mechanical characteristics of the extension-molded product had a tensile strength of 48 GPa and a tensile modulus of 740 MPa.

Example 5

The cutting pattern used was as shown in FIG. 5 in which discontinuous incisions are made in a direction crossing the reinforcement fibers to form linearly aligned discontinuous incisions; all incisions have a substantially equal absolute value of angle θ between the reinforcement fibers and the incisions, and about a half of the incisions have an angle of the opposite positive/negative sign to that of the other half; when looking at any one incision and neighboring ones, that one incision is surrounded by four incisions each having an angle of the opposite positive/negative sign to and located closer than the closest one among those having an angle of the same sign; and the pattern has a fiber length L of 24 mm, an angle θ of ±14°, and a Ws of 1 mm. Except for this, the same procedure as in Example 2 was carried out to produce an incised prepreg sheet, followed by performing evaluation in the same way as above.

Regarding handleability of the incised prepreg, tearing of the polyethylene film occurred sporadically along incisions, and pasting and peeling of adhesive tape had to be repeated a few times to remove the polyethylene film. The incised prepreg had an extension rate of 1.7 in the molding process, and although only few opened incisions were found, independent incisions were found in the surface quality test for the extension-molded product. Examination of the mechanical characteristics of the extension-molded product had a tensile strength of 48 GPa and a tensile modulus of 770 MPa.

Example 6

Except for using the cutting pattern shown in FIG. 6, which is the same cutting pattern as used in Example 1, the same procedure as in Example 2 was carried out to prepare an incised prepreg sheet, followed by performing evaluation in the same way as above.

The incised prepreg had a high handleability as seen from the findings that there was no tearing of the polyethylene film along incisions, allowing the entire polyethylene film to be removed in one step. The incised prepreg had an extension rate of 1.7 in the molding process, and the extension-molded product had very high surface quality as shown by the findings that there were no opened incisions so that even the existence of incisions was substantially invisible. Examination of the mechanical characteristics of the extension-molded product had a tensile strength of 48 GPa and a tensile modulus of 810 MPa.

Example 7

Except for using a cutting pattern in which discontinuous incisions are made in a direction crossing the reinforcement fibers to form parallel lines of linearly aligned discontinuous incisions with a line-to-line distance of 8.5 mm, an angle θ of 45° between the reinforcement fibers and the incisions, a fiber length L of 24 mm, a Ws of 1.0 mm, the same procedure as in Example 2 was carried out to prepare an incised prepreg sheet, followed by performing evaluation in the same way as above.

Regarding handleability of the incised prepreg, tearing of the polyethylene film occurred along incisions, and pasting and peeling of adhesive tape had to be repeated a few times to remove the polyethylene film. The incised prepreg had an extension rate of 1.8 in the molding process, and opened incisions were found in the surface quality test for the extension-molded product. Examination of the mechanical characteristics of the extension-molded product had a tensile strength of 48 GPa and a tensile modulus of 610 MPa.

Example 8

Except for using a cutting pattern in which discontinuous incisions are made in a direction crossing the reinforcement fibers to form parallel lines of linearly aligned discontinuous incisions with a line-to-line distance of 12 mm, an angle θ of 90° between the reinforcement fibers and the incisions, a fiber length L of 24 mm, a Ws of 20 mm, the same procedure as in Example 2 was carried out to prepare an incised prepreg sheet, followed by performing evaluation in the same way as above.

Regarding handleability of the incised prepreg, incisions in the polyethylene film were widely opened to let the resin bleed out and stick to hands during handling. In addition, the polyethylene film was torn along incisions, and pasting and peeling of adhesive tape had to be repeated a few times to remove the polyethylene film. The incised prepreg had an extension rate of 1.9 in the molding process, and opened incisions and flowing fibers were found in the surface quality test for the extension-molded product. Examination of the mechanical characteristics of the extension-molded product had a tensile strength of 46 GPa and a tensile modulus of 450 MPa.

Example 9

Except for using a cutting pattern in which discontinuous incisions are made in a direction crossing the reinforcement fibers to form parallel lines of linearly aligned discontinuous incisions with a line-to-line distance of 8.5 mm, an angle θ of 45° between the reinforcement fibers and the incisions, a fiber length L of 24 mm, a Ws of 17.0 mm, the same procedure as in Example 2 was carried out to prepare an incised prepreg sheet, followed by performing evaluation in the same way as above.

Regarding handleability of the incised prepreg, tearing of the polyethylene film occurred along incisions, and pasting and peeling of adhesive tape had to be repeated a few times to remove the polyethylene film. The incised prepreg had an extension rate of 2.0 in the molding process, and opened incisions and flowing fibers were found in the surface quality test for the extension-molded product. Examination of the mechanical characteristics of the extension-molded product had a tensile strength of 45 GPa and a tensile modulus of 380 MPa.

Comparative Example 4

A prepreg sheet as prepared in Example 1 without making incisions was used. Evaluation was performed regarding the extension rate in the molding process and the surface quality and mechanical characteristics of extension-molded products. The prepreg had an extension rate of 1.1 in the molding process. Although extension molding was attempted, it was impossible to extend the prepreg to the size of the mold and the resin bled out of the mold, leading to a lack of surface resin and deteriorated quality. Examination of the mechanical characteristics of the extension-molded product had a tensile modulus of 48 GPa and a tensile strength of 920 MPa.

TABLE 1

|  | Cutting pattern | | | Handleability of incised prepreg sheet | Extension rate of incised prepreg in molding step | Surface quality of moldings | Tensile modulus of moldings (Gpa) | Tensile strength of moldings (Mpa) |
| --- | --- | --- | --- | --- | --- | --- | --- | --- |
|  | Fiber length L (mm) | incision width Ws (mm) | incision angle θ (°) | | | | | |
| Example 2 | 24 | 1.0 | 90 | A | 1.5 | C | 46 | 670 |
| Example 3 | 24 | continuous | 14 | C | 2.1 | C | 46 | 710 |
| Example 4 | 24 | 1.0 | 14 | B | 1.7 | B | 48 | 740 |
| Example 5 | 24 | 1.0 | ±14 | B | 1.7 | B | 48 | 770 |
| Example 6 | 24 | 0.25 | ±14 | A | 1.7 | A | 48 | 810 |
| Example 7 | 24 | 1.0 | 45 | B | 1.8 | C | 45 | 610 |
| Example 8 | 24 | 20 | 90 | C | 1.9 | C | 46 | 450 |
| Example 9 | 24 | 14 | 45 | C | 2.0 | C | 45 | 380 |

The invention claimed is:

1. An incised prepreg comprising a layer containing reinforcement fiber impregnated with a resin composition, the incised prepreg having a plurality of incisions, at least partly containing reinforcement fibers with a fiber length (L) of 10 to 300 mm, and having a reinforcement fiber content by volume Vf of 45% to 65%, wherein a plurality of discontinuous incisions crossing the reinforcement fibers exist at least in a part of the incised prepreg, the discontinuous incisions being in a linear shape and having a substantially equal length Y, and a distance between neighboring incisions on the same straight line is more than 3 times as long as Y.

2. The incised prepreg as set forth in claim 1, comprising a first layer containing reinforcement fibers and two second layers containing reinforcement fibers impregnated with a resin composition, each surface of the first layer being covered with a second layer, and the impregnation rate with the resin composition in the prepreg being 10% to 90%.

3. The incised prepreg as set forth in claim 2, wherein the each second layer comprises a type A layer containing reinforcement fibers impregnated with a thermosetting resin composition and a type B layer containing particles or fibers of a thermoplastic resin, the type B layer facing a surface of the incised prepreg.

4. The incised prepreg as set forth in claim 1, wherein when one surface of the incised prepreg is brought into contact with water under a pressure of 10 cm water column at room temperature, the water start to bleed out from the other surface within one minute.

5. The incised prepreg as set forth in claim 1, wherein the thickness of an incised prepreg laminate formed by laminating incised prepreg plies by a method of forming an incised prepreg laminate, wherein a single sided mold and a bag film are combined to form a closed space and a laminate of stacked incised prepreg plies is placed in the closed space, followed by evacuating the closed space at room temperature so that the laminate of stacked incised prepreg plies is compressed by the pressure difference from the atmospheric pressure to produce an incised prepreg laminate is larger by 5% to 50% than the thickness of the fiber reinforced plastic material formed by heating and solidifying the incised prepreg laminate.

6. The incised prepreg as set forth in claim 1, that provides a fiber reinforced plastic material containing a substantially void-free curved part formed of a laminate of 16 to 32 layers of the incised prepreg by a curved surface formation method, wherein a closed space is formed between a female cavity having a curved surface with a curvature radius of 10 mm and a bag film, and a laminate of stacked 16 to 32 incised prepreg layers is placed in the closed space, followed by evacuating the closed space so that the laminate of stacked 16 to 32 incised prepreg layers is compressed by a pressure difference from atmospheric pressure while heating is performed simultaneously to solidify the laminate to form a fiber reinforced plastic material.

7. The incised prepreg as set forth of claim 1, wherein at least part of the incised prepreg has a plurality of discontinuous incisions crossing the reinforcement fibers; when projected in a direction perpendicular to the reinforcement fibers in a plane of the incised prepreg, each incision having a projected length Ws of 30 μm to 1.5 mm; and in any region surrounded in the reinforcement fiber's length direction by discontinuous incisions, substantially all reinforcement fibers are cut by incisions.

8. The incised prepreg as set forth in claim 1, wherein the absolute value of angle θ which is the angle between the incisions and reinforcement fibers is 2° to 25°.

9. The incised prepreg as set forth in claim 1, wherein a plurality of discontinuous incisions crossing the reinforcement fibers exist at least in a part of the incised prepreg, the discontinuous incisions being located linearly and parallel to each other to form lines, and a distance X between the lines is 1 to 5 mm.

10. The incised prepreg as set forth in claim 1, wherein a plurality of discontinuous incisions crossing the reinforcement fibers exist at least in a part of the incised prepreg, the discontinuous incisions being located linearly, all incisions having a substantially equal absolute θ value, and about a half of the incisions having an angle of the opposite positive/negative sign to that of the other half.

11. The incised prepreg as set forth in claim 10, wherein a randomly selected incision A is surrounded by neighboring incisions of which four or more incisions, C, have an angle θ that is different in sign from the incision A, but has a smaller minimum distance from the incision A than the incision B that is closest to the incision A among those having an angle θ of the same sign.

12. The incised prepreg as set forth in claim 1, wherein a plurality of discontinuous incisions crossing the reinforcement fibers exist at least in a part of the incised prepreg, the discontinuous incisions being in a linear shape and having a substantially equal length Y and the minimum distance between incisions adjacent to each other being longer than the incision length Y.

13. An incised prepreg sheet comprising an incised prepreg as set forth in claim 1 and a tape-shaped support A laminated thereon to be in contact with one surface thereof, the tape-shaped support A also having incisions in the through-thickness direction of the tape-shaped support A, the incisions being localized in a 5% to 75% region from the surface in contact with the incised prepreg, and the incisions continuing from the corresponding incisions in the incised prepreg.

14. The incised prepreg sheet as set forth in claim 13, comprising an incised prepreg laminated with a tape-shaped support B to be in contact with the surface thereof that is not covered with the tape-shaped support A, wherein the tape-shaped support B contains incisions penetrating therethrough in a thickness direction and continuing to corresponding incisions in the incised prepreg.

* * * * *